(12) United States Patent
Chatterji et al.

(10) Patent No.: US 6,502,636 B2
(45) Date of Patent: Jan. 7, 2003

(54) METHODS AND COMPOSITIONS FOR GROUTING HEAT EXCHANGE PIPE

(75) Inventors: Jiten Chatterji, Duncan, OK (US); Roger S. Cromwell, Walters, OK (US); W. Andrew Liao, Kingwood, OK (US); Jason G. Bell, Kingwood, TX (US)

(73) Assignee: Halliburton Energy Services, Inc., Duncan, OK (US)

(*) Notice: Subject to any disclaimer, the term of this patent is extended or adjusted under 35 U.S.C. 154(b) by 113 days.

(21) Appl. No.: 09/785,906

(22) Filed: Feb. 16, 2001

(65) Prior Publication Data

US 2002/0056404 A1 May 16, 2002

Related U.S. Application Data

(62) Division of application No. 09/390,902, filed on Sep. 7, 1999, now Pat. No. 6,258,160.

(51) Int. Cl.[7] ............................................. E21B 33/13
(52) U.S. Cl. .................. 166/293; 405/266; 405/267
(58) Field of Search ................ 166/293; 405/266, 405/267

(56) References Cited

U.S. PATENT DOCUMENTS

| | | | |
|---|---|---|---|
| 4,377,416 A | * 3/1983 | Maul et al. | |
| 4,478,640 A | * 10/1984 | Holland | |
| 4,514,228 A | * 4/1985 | Gouvenot | |
| 4,696,698 A | 9/1987 | Harriett | 106/74 |
| 4,696,699 A | 9/1987 | Harriett | 106/74 |
| 4,797,158 A | 1/1989 | Harriett | 106/74 |
| 4,886,550 A | * 12/1989 | Alexander | 405/267 |
| 4,935,034 A | * 6/1990 | Alexander | 52/415 |
| 4,948,428 A | 8/1990 | Laio | 106/628 |
| 4,964,918 A | 10/1990 | Brown et al. | 106/811 |
| 5,021,094 A | 6/1991 | Brown et al. | 106/803 |
| 5,096,497 A | * 3/1992 | Beale et al. | 166/692 |
| 5,106,423 A | 4/1992 | Clarke | 106/789 |
| 5,294,255 A | * 3/1994 | Smetara et al. | 106/698 |
| 5,332,040 A | * 7/1994 | Nahm et al. | 166/293 |
| 5,343,950 A | * 9/1994 | Hale et al. | 166/293 |
| 5,343,951 A | * 9/1994 | Cowan et al. | 166/293 |
| 5,389,146 A | 2/1995 | Liao | 106/811 |
| 5,501,277 A | 3/1996 | Onan et al. | 166/293 |
| 5,512,096 A | 4/1996 | Krause | 106/718 |
| 6,060,535 A1 | * 5/2001 | Villar et al. | 523/130 |
| 6,251,179 B1 | * 6/2001 | Allan | 106/719 |

FOREIGN PATENT DOCUMENTS

| | | | |
|---|---|---|---|
| CA | 1335898 | * | 6/1995 |
| CZ | 281742 | * | 1/1997 |
| DE | 2532304 | * | 1/1976 |
| FR | 2773146 | * | 7/1999 |
| JP | 60090860 | * | 5/1985 |
| JP | 63017246 | * | 1/1988 |
| JP | 06166556 | * | 6/1994 |
| JP | 11106244 | * | 4/1999 |
| JP | 11200786 | * | 7/1999 |

OTHER PUBLICATIONS

"Grout Testing & Characterization for Shallow Land Burial Grounds at the Idaho Nat'l Engin. Lab" Tallen et al. Energy Res Abst. 12(2) Abst. #3491, 1987.*

* cited by examiner

*Primary Examiner*—Paul Marcantoni
(74) *Attorney, Agent, or Firm*—Craig W. Roddy; C. Clark Dougherty, Jr.

(57) ABSTRACT

The present invention provides improved methods and compositions for grouting heat exchange pipe in a hole or trench in the ground. The grouting compositions of the invention have quick set and high thermal conductivity properties and are basically comprised of an amorphous silica material, an alkaline earth metal oxide or hydroxide, a water swellable clay and water present in an amount sufficient to form a slurry. The compositions optionally also include a set retarder and a thermal conductivity increasing agent.

14 Claims, No Drawings

METHODS AND COMPOSITIONS FOR GROUTING HEAT EXCHANGE PIPE

This application is a divisional of application Ser. No. 09/390,902, filed on Sep. 7, 1999, now U.S. Pat. No. 6,258,160.

BACKGROUND OF THE INVENTION

1. Field of the Invention

The present invention relates to methods and compositions for grouting heat exchange pipe, and more particularly, to grouting such pipe in holes or trenches.

2. Description of the Prior Art

Ground source heat pumps have been utilized heretofore for providing residential and commercial space heating and cooling. A ground source heat pump is similar to conventional air conditioners and heat pumps except that it utilizes the ground to dissipate or collect heat instead of atmospheric air. Since ground temperatures are generally close to residential and commercial room temperatures, ground source heat pumps are cost-effective alternatives to conventional systems in many locations. The cost-effectiveness of ground source heat pumps depends on the climate in the area in which such heat pumps are to be installed, the thermal properties of the ground at that location, the cost of energy at the location and the effectiveness of the heat exchanger utilized to transfer heat to or from the heat pump. The outside heat exchanger connected to a ground source heat pump is usually a loop of plastic pipe which is placed in a hole or trench and sealed therein with a grouting composition. A liquid such as water with or without antifreeze is circulated through the heat exchange pipe loop whereby it collects heat from the ground during the winter or transfers heat into the ground during the summer to thereby heat or cool residential or commercial space. In addition, ground source heat pumps can optionally include heat exchange apparatus to provide free hot water in the summer and substantial hot water savings in the winter.

As mentioned, the ground source heat pump heat exchange pipe loop can be installed in a trench parallel to the ground surface or in a substantially vertical deep hole formed in the ground. The particular configuration utilized depends on the area of the available ground as well as the make-up of the ground, e.g., the quantity of rock contained therein, etc.

Grouting the heat exchange pipe loop, particularly in installations of the pipe in vertical deep holes, is an extremely important aspect of ground source heat pump efficiency and performance. The grouting composition sets into a substantially impermeable mass which functions to position the pipe in the hole and to seal the surfaces of the pipe to the ground. The seal between the pipe and the ground insures that the proper heat transfer between the pipe and the ground takes place. If the grouting composition is not placed completely around and along the entire length of the pipe, the heat transfer will be seriously reduced. In addition, the grouting composition must have high heat transfer properties so that heat will readily and efficiently transfer between the fluid inside the pipe loop and the ground by way of the grouting composition. The grouting of the heat transfer pipe accomplishes a number of environmental protection requirements as follows. The set grout and seal provided thereby protects water reservoirs penetrated by the hole, i.e., the set grout prevents leakage from the surface into water reservoirs by way of the hole penetrating the reservoirs thereby preventing contamination of the reservoirs. The presence of the set grout also prevents flow between formations penetrated by the hole, e.g., between salt water and fresh water containing formations. The set grout also seals formations or zones containing pressurized fluid thereby preventing blow-outs through the hole to the surface.

In order to accomplish the various objectives mentioned above, the grouting composition used should have the following properties. The grouting composition must have a high thermal conductivity upon setting to provide the required heat transfer between the heat exchange pipe and the walls of the hole in the ground. The grouting composition must have a low viscosity during placement so that it can enter the space between the walls of the pipe loop and the hole in the ground without leaving voids containing air that reduce heat transfer. In addition, the grouting composition must not shrink during setting so that voids or channels are not formed which reduce heat transfer between the heat exchange pipe and the ground and/or allow pressurized fluids to flow between formations or to the surface.

While compositions for grouting heat pump heat exchange pipes in the ground have been developed and used heretofore, there is a continuing need for an improved grouting composition which has the properties set forth above.

SUMMARY OF THE INVENTION

The present invention provides methods and compositions for grouting heat exchange pipe which meet the needs described above and overcome the deficiencies of the prior art. The grouting compositions of this invention quickly set and have high thermal conductivities. The grouting compositions are basically comprised of an amorphous silica material selected from the group consisting of fly ash, condensed silica fume, rice hull ash, natural pozzolan and mixtures of two or more of such materials; a water swellable clay selected from the group consisting of Wyoming sodium bentonite and Western sodium bentonite; water present in an amount sufficient to form a slurry; and an alkaline earth metal oxide or hydroxide present in an amount sufficient to react with the amorphous silica material in the presence of water to form a cementitious composition which sets into a hard substantially impermeable mass. The grouting composition optionally also includes a set retarding agent and a thermal conductivity increasing agent.

A particularly preferred grouting composition of this invention having the above mentioned properties is comprised of ASTM Class C fly ash, condensed silica fume, sodium bentonite, a citric acid set retarder, a thermal conductivity increasing agent comprised of desulfurized coke containing at least 80% by weight carbon and fresh water present in an amount sufficient to form a slurry.

The methods of this invention for grouting a heat exchange pipe in a hole or trench in the ground are comprised of the following steps. A quick set low permeability grouting composition having high thermal conductivity is prepared comprised of an amorphous silica material, a water swellable clay, an alkaline earth metal oxide or hydroxide and water. The grouting composition is placed in the hole or trench between the ground and the walls of the pipe, and the grouting composition is allowed to set therein.

It is, therefore, a general object of the present invention to provide improved methods and compositions for grouting heat exchange pipes.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods and compositions for grouting the heat exchange pipe loops of ground source heat pumps in holes or trenches in the ground. The grouting compositions of this invention have high thermal conductivities to provide excellent heat transfer between heat exchange pipe loops and the ground. In addition, the unset grouting compositions have relatively high solids content but still have low viscosities so that they can be placed in holes or trenches in the ground around heat exchange pipe loops without leaving voids and air spaces therein. After being placed, the grouting compositions quickly set into low permeability solid masses with little or no shrinkage whereby voids or channels are not formed therein.

The grouting compositions of this invention are basically comprised of an amorphous silica material, a water swellable clay, water present in an amount sufficient to form a slurry and an alkaline earth metal oxide or hydroxide present in an amount sufficient to react with the amorphous silica material in the presence of water to form a cementitious composition which sets into a hard substantially impermeable mass.

While various forms of alkaline earth metal oxide or hydroxide activated amorphous silicas can be utilized in accordance with this invention, preferred such amorphous silica materials are those selected from the group consisting of fly ash, condensed silica fume, rice hull ash, natural pozzolan and mixtures of two or more of such materials. The term "fly ash" is used herein to mean the finely divided synthetic pozzolan type of material which is the residue that results from the combustion of ground or powdered coal and is carried by the flue gases generated. Fly ash, like natural pozzolan, possesses little or no cementitious value, but in finely divided form and in the presence of water chemically reacts with an alkaline earth metal oxide or hydroxide to form a material possessing cementitious properties. Fly ash particles have diameters smaller than about 36 microns, and the surface area of the particles is generally greater than about 400 square meters per kilogram.

Condensed silica fume is another pozzolan type of material which is a byproduct produced in the manufacture of silicon and ferosilicon. Silicon and ferosilicon are obtained by subjecting quartz (when silicon is produced) or quartz and iron bearing material (when ferosilicon is produced) to reduction with coke or coal and wood chips in an open electric arc furnace. The reduction reaction involves an immediate reaction wherein a gaseous suboxide of silicon is formed and part of the gaseous suboxide of silicon escapes into the atmosphere. The gaseous suboxide of silicon reacts with oxygen in the atmosphere and condenses to form glassy microscopic particles known as condensed silica fume.

The condensed silica fume is recovered by filtration, and like fly ash, is characterized by having a fine particle size. The particles of condensed silica fume have diameters smaller than about 1 micron. The specific surface area of condensed silica fume particles is about 20,000 square meters per kilogram.

Rice hull ash is also a pozzolan type of amorphous silica material similar in particle size and physical characteristics to fly ash. Rice hull ash is obtained by burning rice hulls.

Natural pozzolan is obtained from powdered volcanic rock and the like, and is comprised of a siliccous or siliceous and aluminous material which reacts in the presence of water with an alkaline earth metal oxide or hydroxide to produce a cementitious material.

A preferred fine particle size amorphous silica material for use in accordance with the present invention which includes alkali in situ is a fine particle size fly ash classified as ASTM Class C fly ash. ASTM Class C fly ash has the approximate physical properties set forth in Table I below.

TABLE I

Physical Properties of Fine Particle Size ASTM Class C Fly Ash

| | |
|---|---|
| Appearance: | Light tan to mustard |
| Specific Gravity[1]: | 2.70 |
| Average Bulk Density[2]: | 77 lb/cu. ft. |
| Absolute Volume Factor: | 0.0487 |
| Average Particle Size: | 9 microns |
| Maximum Particle Size: | 36 microns |
| Percent Under 8.0 microns: | 40% |
| Specific Surface Area: | Range: 1.15–1.63 m$^2$/cc |
| Normal Water Requirement: | 40% |

[1]Specific gravity determination by Beckman air compression pycnometer.
[2]Apparent bulk density determination (ASTM C110 Part 15 & 16).
[3]API Specification for Materials and Testing for Well Cements, Fifth Edition, July 1, 1990, page 42, Appendix B, Section B1; "Determination of Normal and Minimal Water Content of Slurry."

The oxide analysis of ASTM Class C fly ash having the above physical properties is set forth in Table II below.

TABLE II

Oxide Analysis of ASTM Class C Fly Ash

| Component | Percent by Weight |
|---|---|
| Aluminum Oxide (Al$_2$O$_3$) | 16.78 |
| Silicon Dioxide (SiO$_2$) | 31.47 |
| Iron Oxide (Fe$_2$O$_3$) | 7.09 |
| Al$_2$O$_3$ + SiO$_2$ + Fe$_2$O$_3$ | 55.34 |
| Calcium Oxide (CaO) | 29.91 |
| Sulfur Trioxide (SO$_3$) | 3.39 |
| Magnesium Oxide (MgO) | 6.18 |
| Titanium Dioxide (TiO$_2$) | 1.37 |
| Potassium Oxide (K$_2$O) | 0.45 |
| Sodium Oxide (Na$_2$O) | 1.36 |
| Total Alkali (K$_2$O × .658 + Na$_2$O) | 1.65 |
| Strontium Oxide (SrO) | 0.48 |
| Barium Oxide (BaO) | 0.96 |
| Manganese Oxide (MnO) | 0.05 |
| Loss on Ignition (LOI) | 0.52 |
| Free Lime (ASTM) | 0.60 |
| Borate Content | 0.00 |

A particularly preferred fine particle size amorphous silica material for use in accordance with the methods of this invention is comprised of a mixture of ASTM Class C fly ash and condensed silica fume wherein the silica fume is present in an amount in the range of from about 5% to about 30% by weight of the ASTM Class C fly ash present. The mixture is included in a grouting composition of this invention in an amount in the range of from about 30% to about 60% by weight of the composition.

The water swellable clay utilized in accordance with the present invention can be Wyoming or Western sodium bentonite or other water swellable clay material or mixture. The water swellable clay provides viscosity to the grouting composition and functions as an extender in the grouting composition. The water swellable clay is included in the grouting composition in an amount of from about 2% to about 5% by weight of the composition.

The water utilized can be water from any source provided that it does not adversely affect the components or properties of the resulting grouting composition. Preferably, fresh water is utilized in the grouting composition in an amount sufficient to form a pumpable slurry. Generally, the water is present in the grouting composition in an amount in the range of from about 30% to about 50% by weight of the grouting composition.

When amorphous silica materials other than ASTM Class C fly ash are utilized, an alkaline earth metal oxide or hydroxide is included in the grouting composition. Preferred alkaline earth metal oxide or hydroxides are selected from the group consisting of calcium hydroxide, barium hydroxide, magnesium oxide, strontium oxide and mixtures of such compounds. Of these, calcium hydroxide is the most preferred alkaline earth metal oxide or hydroxide. Generally, the alkaline earth metal oxide or hydroxide is included in the grouting composition in an amount in the range of from about 10% to about 20% by weight of the amorphous silica material included therein.

A particularly preferred grouting composition of this invention is comprised of ASTM Class C fly ash present in the composition in an amount in the range of from about 25% to about 50% by weight of the composition, condensed silica fume present in the composition in an amount in the range of from about 1% to about 4.5% by weight of the composition, sodium bentonite present in an amount in the range of from about 2% to about 5% by weight of the composition and fresh water present in an amount in the range of from about 30% to about 50% by weight of the composition.

In order to allow enough placement time for the grouting composition, a set retarding additive can be included in the composition. A variety of set retarding additives can be utilized including, but not limited to, ammonium and other metal lignosulfonate salts, e.g., calcium lignosulfonate, sodium lignosulfonate and the like, tartaric acid, citric acid, trisodium citrate, gluconic acid, potassium pentaborate, potassium perborate, the copolymer of 2-acrylamido-2-methylpropane sulfonic acid and acrylic acid (described in U.S. Pat. No. 5,049,288 issued Sep. 17, 1991 to Brothers et al.) aminotri(methylenephosphonic acid) and mixtures of two or more of such set retarders. Preferably, the set retarder is citric acid present in the grouting composition in an amount in the range of from about 0.2% to about 0.5% by weight of the composition.

In order to improve the thermal conductivity of the grouting composition of this invention, a thermal conductivity increasing agent can be included in the composition. Examples of such agents include, but are not limited to silica sand, fused alumina, graphite and desulfurized petroleum coke. Of these, desulfurized coke containing at least 80% by weight carbon is preferred. When used, the thermal conductivity increasing agent is generally included in the grouting composition in an amount in the range of from about 5% to about 20% by weight of the composition.

The grouting compositions can include other additives known to those skilled in the art of grouting or cementing pipe in the ground. The additives used must bring about desired results without adversely affecting other components in the grouting composition or the properties thereof.

The grouting compositions of this invention quickly set into hard substantially impermeable masses in time periods in the range of from about 0.5 hours to about 12 hours at relatively low densities, i.e., grout composition densities in the range of from about 11 to about 13 pounds per gallon.

The methods of this invention for grouting a heat exchange pipe in a hole or trench in the ground are basically comprised of the following steps. A quick set grouting composition having high thermal conductivity is prepared comprised of an amorphous silica material, a water swellable clay, water present in an amount sufficient to form a slurry and an alkali present in an amount sufficient to form a slurry and an alkali present in an amount sufficient to react with said amorphous silica material in the presence of water to form a cementitious composition which sets into a hard substantially impermeable mass. The grouting composition is placed in the hole or trench between the ground and the exterior surfaces of the pipe therein and then allowed to set.

In order to further illustrate the methods and grouting compositions of this invention, the following example is given.

EXAMPLE

Test grouting compositions of this invention were prepared comprised of ASTM Class C fly ash, condensed silica fume, sodium bentonite, fresh water, citric acid set retarder and various thermal conductivity increasing agents. Each composition was prepared by adding the various solid components to the water while stirring the resulting slurry. The components and their quantities for each test grouting composition are set forth in Table III below.

Each test grouting composition was tested for viscosity at 5 minutes after mixing, hydraulic conductivity after setting, shrinkage after setting and thermal conductivity after setting.

The viscosity measurements were made 5 minutes after mixing each grouting composition using a Fann Model 35A viscometer equipped with a multiple torsion spring. If a test composition had a viscosity reading below 600 it was deemed to pass and if the reading was above 600 the composition was deemed to have failed.

The hydraulic conductivity tests were determined by measuring the coefficient of permeability through the grout composition over a definite time interval. The hydraulic conductivity was then calculated based on Darcy's Law. If a test composition had a hydraulic conductivity over $1 \times 10^{-6}$ cm/sec, it was deemed to have failed.

The shrinkage of each test grouting composition was determined by measuring the initial volume of the slurry and comparing that volume to the volume of the set composition. If the shrinkage in volume was greater than 10%, the grouting composition was deemed to have failed.

The thermal conductivity of each test grouting composition was obtained by measurement with a Bayroid thermal conductivity meter. The value was recorded once the thermal conductivity reached a steady state. A test grouting composition having a thermal conductivity less than 0.8 BTU/(Hr-Ft-° F.) was deemed to have failed.

The results of these tests are given in Table III below.

TABLE III

Test Grouting Composition Properties

| Test Composition No. | Water, % by weight of composition | ASTM Class C Fly Ash, % by weight of composition | Condensed Silica Fume, % by weight of composition | Sodium Bentonite, % by weight of composition | Citric Acid, % by weight of composition | Thermal Conductivity Enhancing Agent/Particle Size | Amount, % by weight of composition | Viscosity[1] | Hydraulic Conductivity[2] | Shrinkage[3] | Thermal Conductivity[4] |
|---|---|---|---|---|---|---|---|---|---|---|---|
| 1 | 37 | 50.86 | 8.98 | 2.84 | 0.32 | — | — | — | — | — | Fail |
| 2 | 37 | 37.49 | 6.60 | 2.84 | 0.32 | Silica Sand/100–400 microns | 15.75 | — | — | — | Fail |
| 3 | 37 | 24.10 | 4.25 | 2.84 | 0.32 | Silica Sand/100–400 microns | 31.5 | — | — | — | Fail |
| 4 | 37 | 37.49 | 6.60 | 2.84 | 0.32 | Hemitite/20–100 microns | 15.75 | — | — | — | Fail |
| 5 | 37 | 24.10 | 4.25 | 2.84 | 0.32 | Calcium Carbonate/50–450 microns | 31.5 | — | — | — | Fail |
| 6 | 37 | 24.10 | 4.25 | 2.84 | 0.32 | Aluminum Oxide/75–400 microns | 31.50 | — | — | — | Fail |
| 7 | 37 | 24.10 | 4.25 | 2.84 | 0.32 | Barite/6–100 microns | 31.50 | — | — | — | Fail |
| 8 | 37 | 37.49 | 6.60 | 2.84 | 0.32 | Desul. Coke/75–600 microns | 15.75 | Pass | Pass | Pass | Pass |
| 9 | 37 | 42.84 | 8.00 | 2.84 | 0.32 | Desul. Coke/180–850 microns | 9.45 | Fail | — | — | — |
| 10 | 37 | 24.10 | 4.25 | 2.84 | 0.32 | 0.5:0.5 Mixture of Desul. Coke and Silica Sand/75–600 microns | 31.5 | Pass | Pass | Pass | Pass |
| 11 | 37 | 37.49 | 6.60 | 2.84 | 0.32 | Desul. Coke/180–850 microns | 15.75 | Pass | Pass | Pass | Pass |
| 12 | 37 | 45.52 | 8.02 | 2.84 | 0.32 | Desul. Coke/50–200 microns | 6.3 | Pass | Pass | Pass | Pass |
| 13 | 37 | 45.52 | 8.02 | 2.84 | 0.32 | Desul. Coke/100–300 microns | 6.3 | — | Fail | — | Pass |

[1] 300 rpm reading <600-pass
[2] $k_{bc}$ <1 × 10$^{-6}$ cm/sec-pass
[3] Less than 10%-pass
[4] $k_a$ > 0.8 BTU/(Hr-Ft-°F)-pass From Table III it can be seen that the compositions containing desulfurized coke passed all of the various tests.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of grouting a heat exchange pipe in a hole or trench in the ground comprising the steps of:
    (a) preparing a quick set grouting composition having high thermal conductivity compared to conventional cement grouts, comprising ASTM Class C fly ash present in an amount in the range of from about 25% to about 50% by weight of said composition; a second amorphous silica material selected from the group consisting of condensed silica fume, rice hull ash, natural pozzolan and mixtures of two or more said materials, present in an amount in the range of from about 1% to about 4.5% by weight of said composition; a water swellable sodium bentonite clay present in an amount in the range of from about 2% to about 5% by weight of said composition; and water present in an amount in the range of from about 30% to about 50% by weight of said composition;
    (b) placing said grouting composition in said hole or trench between the ground and the walls of said pipe; and
    (c) allowing said grouting composition to set therein.

2. The method of claim 1 wherein second amorphous silica material is condensed silica fume.

3. The method of claim 1 wherein said water swellable clay is selected from the group consisting of Wyoming sodium bentonite and Western sodium bentonite and is present in said composition in an amount of from about 2% to about 5% by weight of said composition.

4. The method of claim 1 wherein said water is fresh water.

5. The method of claim 1 which further comprises a set retarder selected from the group consisting of ammonium and metal lignosulfonate salts, tartaric acid, citric acid, trisodium citrate, gluconic acid, potassium pentaborate, potassium perborate, the copolymer of 2-acrylamido-2-methylpropane sulfonic acid and acrylic acid, aminotri (methylenephosphonic acid) and mixtures of two or more of said set retarders.

6. The method of claim 5 wherein said set retarder is citric acid and is present in said composition in an amount in the range of from about 0.2% to about 0.5% by weight of said composition.

7. The method of claim 1 wherein said quick set grouting composition further comprises a thermal conductivity increasing agent selected from the group consisting of fused alumina, graphite and petroleum coke.

8. The method of claim 7 wherein said thermal conductivity increasing agent is desulfurized petroleum coke and is present in said composition in an amount in the range of from about 5% to about 20% by weight of said composition.

9. The method of claim 1 wherein said quick set grouting composition having high thermal conductivity comprises ASTM Class C fly ash present in an amount in the range of from about 25% to about 50% by weight of said composition, condensed silica fume present in an amount in the range of from about 1% to about 4.5% by weight of said composition, sodium bentonite present in an amount in the range of from about 2% to about 5% by weight of said composition, and fresh water present in an amount in the range of from about 30% to about 50% by weight of said composition.

10. The method of claim 9 wherein said composition further comprises citric acid set retarder present in an amount in the range of from about 0.2% to about 0.5% by weight of said composition.

11. The method of claim 10 wherein said composition further comprises a desulfurized petroleum coke thermal conductivity increasing agent present in an amount in the range of from about 5% to about 20% by weight of said composition.

12. A method of grouting a heat exchange pipe in a hole or trench in the ground comprising the steps of:
    (a) preparing a quick set grouting composition having high thermal conductivity compared to conventional cement grouts comprising ASTM Class C fly ash present in an amount in the range of from about 25% to about 50% by weight of said composition, condensed silica fume present in an amount in the range of from about 1% to about 4.5% by weight of said composition, sodium bentonite present in an amount in the range of from about 2% to about 5% by weight of said composition, and fresh water present in an amount in the range of from about 30% to about 50% by weight of said composition;
    (b) placing said grouting composition in said hole or trench between the ground and the walls of said pipe; and
    (c) allowing said grouting composition to set therein.

13. The method of claim 12 wherein said grouting composition further comprises citric acid set retarder present in an amount in the range of from about 0.2% to about 0.5% by weight of said composition.

14. The method of claim 13 wherein said grouting composition further comprises a desulfurized petroleum coke thermal conductivity increasing agent present in an amount in the range of from about 5% to about 20% by weight of said composition.

* * * * *